(12) United States Patent
Guzda (10) Patent No.: US 8,669,019 B2
(45) Date of Patent: Mar. 11, 2014

(54) WATER VAPOR TRANSFER MEMBRANE ATTACHMENT TO GAS DIFFUSION SEPARATORS

(75) Inventor: Jeffrey M. Guzda, Spencerport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 220 days.

(21) Appl. No.: 12/788,713

(22) Filed: May 27, 2010

(65) Prior Publication Data

US 2011/0294032 A1 Dec. 1, 2011

(51) Int. Cl.
*H01M 2/38* (2006.01)

(52) U.S. Cl.
USPC .................. 429/456; 429/457; 429/460

(58) Field of Classification Search
USPC .......................... 429/456, 457, 460
See application file for complete search history.

(56) References Cited

U.S. PATENT DOCUMENTS

| 2008/0001313 A1* | 1/2008 | Zhang et al. ............ 261/100 |
| 2008/0067061 A1* | 3/2008 | Zuber et al. ............ 204/290.08 |
| 2009/0092863 A1* | 4/2009 | Skala ............... 429/12 |

FOREIGN PATENT DOCUMENTS

| CN | 101098021 A | 1/2008 |
| CN | 101409352 A | 4/2009 |

* cited by examiner

*Primary Examiner* — Zachary Best
(74) *Attorney, Agent, or Firm* — Fraser Clemens Martin & Miller LLC; J. Douglas Miller (57) ABSTRACT

A water vapor transfer device for a fuel cell includes a pair of diffusion medium layers, a pair of edge strips, an array of elongate cords, and a pair of polymer membranes. One of the edge strips is disposed between the first edges of the diffusion medium layers. Another of the edge strips is disposed adjacent the second edge of each of the diffusion medium layers. The edge strips are bonded to each of the diffusion medium layers with a hot-melt adhesive. The elongate cords are disposed between the diffusion medium layers and intermediate the edge strips. The elongate cords are bonded to each of the diffusion medium layers with a hot-melt adhesive and define a plurality of flow channels between the diffusion medium layers. The polymer membranes are bonded to the diffusion medium layers adjacent the edge strips with the hot-melt adhesive from the edge strips.

12 Claims, 5 Drawing Sheets

WATER VAPOR TRANSFER MEMBRANE ATTACHMENT TO GAS DIFFUSION SEPARATORS

FIELD OF THE INVENTION

The present disclosure relates to a water vapor transfer device and more particularly to a system and method for assembly of the water vapor transfer device.

BACKGROUND OF THE INVENTION

A fuel cell system is increasingly being used as a power source in a wide variety of applications. The fuel cell system has been proposed for use in vehicles as a replacement for internal combustion engines, for example. The fuel cell system may also be used as a stationary electric power plant in buildings and residences, portable power in video cameras, computers, and the like. Typically, the fuel cell system includes a plurality of fuel cells arranged in a fuel cell stack to generate electricity, which is used to charge batteries or provide power to an electric motor.

A typical fuel cell is known as the polymer electrolyte membrane (PEM) fuel cell, which combines a fuel such as hydrogen and an oxidant such as oxygen to produce electricity and water. The oxygen is generally supplied by an air stream. In order to perform within a desired efficiency range, a sufficient humidification of the polymer electrolyte membranes of the fuel cell should be maintained. The sufficient humidification desirably extends the useful life of the electrolyte membranes in the fuel cell, as well as maintains the desired efficiency of operation.

As part of the fuel cell system, a water vapor transfer (WVT) device may be employed to humidify the air stream entering the fuel cell stack. The WVT device transfers water vapor from an exhaust stream from the fuel cell stack to a feed stream entering the fuel cell stack. This is generally accomplished by using a water vapor transfer membrane which allows only water vapor to pass therethrough. This membrane may be permanently attached to a diffusion media layer, called a separator, which controls gas flow. The locations where the membrane is attached to the separator are desirably leak free.

An exemplary water vapor transport device for a fuel cell system is disclosed in U.S. Pat. Appl. Pub. No. 2009/0092863 to Skala, the entire disclosure of which is hereby incorporated herein by reference. Skala describes a plate for a water vapor transport device having a top layer formed from a diffusion medium and a bottom layer formed from a diffusion medium. An array of substantially planar elongate ribbons is disposed between the top and bottom diffusion medium layers. A membrane is adhered to at least one of the top and bottom diffusion medium layers.

It is also known to manufacture a water vapor transfer separator consisting of a plastic plate with flow channels either machined or molded into the plastic plate. The gas diffusion and membrane layers are attached to the plastic plate using pressure sensitive adhesive (PSA). However, the PSA is difficult and time consuming to apply. Additionally, where the PSA has not been applied correctly, the resulting water vapor transfer device generally cannot be repaired.

There is a continuing need for a manufacturing system and method to efficiently and permanently bond water vapor transfer membranes to gas diffusion separators. Desirably, the manufacturing process creates a durable, leak free bond between the water vapor transfer membranes and the separators, produces an assembly which meets dimensional and flatness tolerances in specific areas without adversely affecting the water vapor transfer rate of the resulting water vapor transfer device, and can be readily incorporated into either a roll-to-roll process or a batched sheet process.

SUMMARY OF THE INVENTION

In concordance with the instant disclosure, a manufacturing process to efficiently and permanently bond water vapor transfer membranes to gas diffusion separators, which creates a durable, leak free bond between the water vapor transfer membranes and the separators, produces an assembly which meets dimensional and flatness tolerances in specific areas without adversely affecting the water vapor transfer rate of the resulting water vapor transfer device, and can be readily incorporated into either a roll-to-roll process or a batched sheet process, is surprisingly discovered.

In one embodiment, a water vapor transfer device for a fuel cell includes a pair of diffusion medium layers. Each of the diffusion medium layers has a first edge and a second edge. A pair of edge strips is disposed between the diffusion medium layers. One of the edge strips is disposed adjacent the first edge of each of the diffusion medium layers. An other of the edge strips is disposed adjacent the second edge of each of the diffusion medium layers. The edge strips are bonded to each of the diffusion medium layers with a hot-melt adhesive. An array of elongate cords is disposed between the diffusion medium layers and intermediate the edge strips. The elongate cords are bonded to each of the diffusion medium layers with a hot-melt adhesive. The elongate cords define a plurality of flow channels between the diffusion medium layers. The diffusion medium layers, the edges strips, and the elongate cords are disposed between a pair of polymer membranes. The polymer membranes are bonded to the diffusion medium layers adjacent the edge strips with the hot-melt adhesive from the edge strips. The polymer membranes are not bonded to the diffusion medium layers between the edge strips.

In a further embodiment, a method for assembly of a water vapor transfer device first includes the step of providing a separator assembly. The separator assembly includes a pair of edge strips and an array of elongate cords disposed between a pair of diffusion medium layers. One of the edge strips is disposed adjacent the first edge of each of the diffusion medium layers. An other of the edge strips is disposed adjacent the second edge of each of the diffusion medium layers. The edge strips are bonded to each of the diffusion medium layers with a hot-melt adhesive. The array of elongate cords is arranged substantially parallel with the first edge and the second edge intermediate the edge strips. The elongate cords are bonded to each of the diffusion medium layers with a hot-melt adhesive and define a plurality of flow channels between the diffusion medium layers. A polymer membrane is disposed on each of the diffusion medium layers of the separator assembly. Heat and pressure is applied to the separator assembly to cause the hot-melt adhesive coating of the edge strips to melt and permeate through the diffusion medium layers and contact the polymer membranes. The hot-melt adhesive coating of the cords is caused to melt and permeate only into the diffusion medium layers. The separator assembly is then cooled to cause the hot-melt adhesive coatings on the edges strips and the cords to solidify and bond the edge strips to both the diffusion medium layers and the polymer membranes. The cords are bonded only to the diffusion medium layers during the cooling of the separator assembly to thereby form the water vapor transfer device.

In another embodiment, a system for assembly of a water vapor transfer device includes means for applying heat and pressure to cause the adhesive coating of the edge strips to melt and permeate through the diffusion medium layers and contact the polymer membranes.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

Figure 1A:
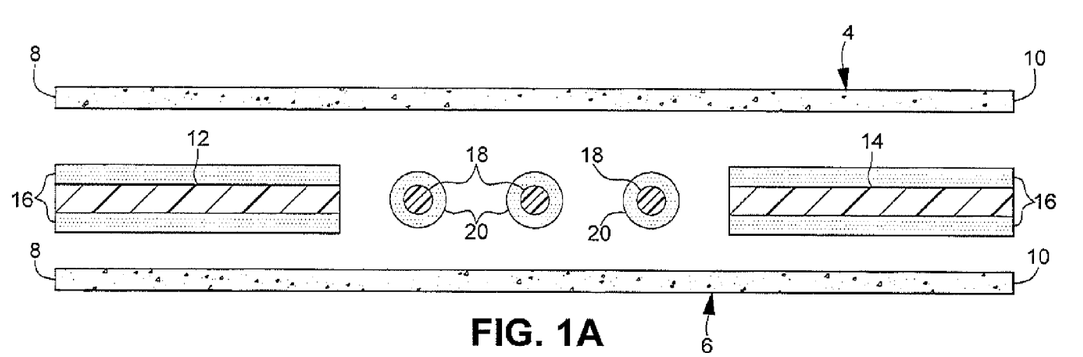
FIGS. 1A-1C illustrate a stepwise sequence of assembly of a water vapor transfer device according to the present disclosure.
Figure 1B:
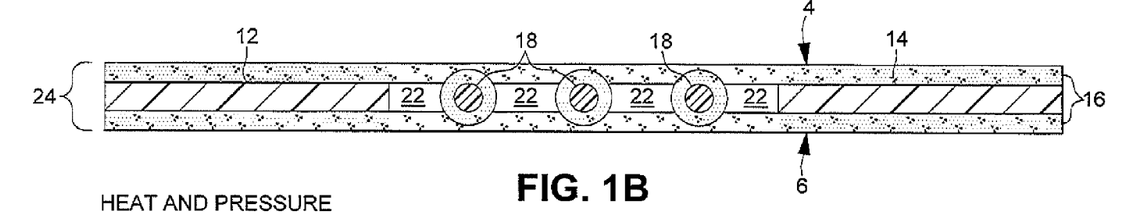
Figure 1C:
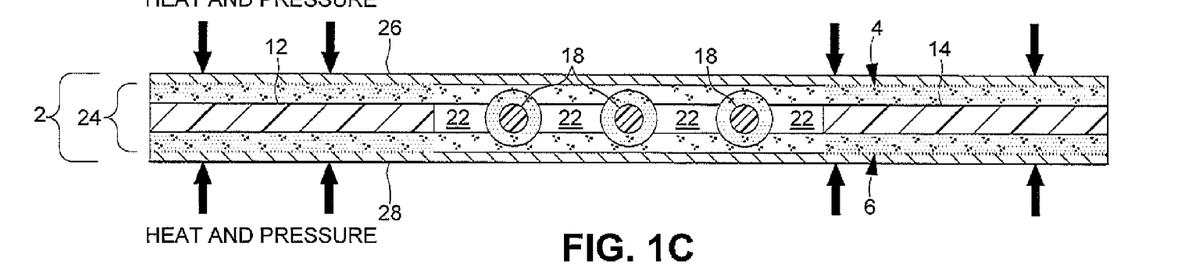

As shown in FIGS. 1A-1C, the present disclosure includes a water vapor transfer device 2 for a fuel cell system. The water vapor transfer device 2 has a pair of diffusion medium layers 4, 6. Each of the diffusion medium layers 4, 6 has a first edge 8 and a second edge 10. As nonlimiting examples, the diffusion medium layers 6, 8 are formed from one of glass fiber, glass-based paper, carbon fiber, and carbon-based paper. One of ordinary skill in the art may select other permeable materials for the diffusion medium layers 6, 8, as desired.

A pair of edge strips 12, 14 is disposed between the diffusion medium layers 4, 6. One of the edge strips 12 is disposed adjacent the first edge 8 of each of the diffusion medium layers 4, 6. The other of the edge strips 14 is disposed adjacent the second edge 10 of each of the diffusion medium layers 4, 6. The edge strips 12, 14 are bonded to each of the diffusion medium layers 4, 6 with a hot-melt adhesive 16. As a nonlimiting example, the edge strips 12, 14 may be formed from polypropylene. Other materials having suitable resistance to the environmental conditions associated with the water vapor transfer device 2 in use may also be employed.

An array of elongate cords 18 is disposed between the diffusion medium layers 4, 6. The elongate cords 18 are also intermediate the edge strips 12, 14. Although only three elongate cords 18 are shown in FIGS. 1A-1C, it should be understood that many more elongate cords 18 may be and typically are provided in an array according to the present disclosure. The elongate cords 18 are bonded to each of the diffusion medium layers 4, 6 with a hot-melt adhesive 20. The elongate cords 18 define a plurality of flow channels 22 between the diffusion medium layers 4, 6. The diffusion medium layers 4, 6 are assembled with the elongate cords 18 to form a separator assembly 24 for the water vapor transfer device 2.

The water vapor transfer device 2 further includes a pair of polymer membranes 26, 28. The polymer membranes 26, 28 may be formed from any material suitable for allowing water vapor to pass therethrough. As a nonlimiting example, the polymer membranes 26, 28 may be formed from perfluorosulfonic acid (PFSA). Other polymer membranes 26, 28 for water vapor transfer may also be employed within the scope of the present disclosure.

The diffusion medium layers 4, 6, the edges strips 12, 14, and the elongate cords 18 forming the separator assembly 24 are disposed between the polymer membranes 26, 28. The polymer membranes 26, 28 are bonded to the diffusion medium layers 4, 6 adjacent the edge strips 12, 14 with the hot-melt adhesive 16 from the edge strips 12, 14. The polymer membranes 26, 28 are not bonded to the diffusion medium layers 4, 6 intermediate the edge strips 12, 14.

In an illustrative embodiment, the edge strips 12, 14 and the elongate cords 18 are coated with the hot-melt adhesive 16, 20. In a particular embodiment, the adhesive coating 16 on the edge strips has a thickness that is greater than a thickness of the hot-melt adhesive coating 20 on the cords 18. The thickness of the hot-melt adhesive coating 16 on the edge strips 12, 14 is sufficient to permeate through the diffusion medium layers 4, 6 and bond with the polymer membranes 26, 28. The thickness of the adhesive coating 20 on the cords 18 is insufficient to permeate through the diffusion medium layers 4, 6 and bond with the polymer membranes 26, 28. In one embodiment, the thickness of the hot-melt adhesive coating 16 on the edge strips 12, 14 is approximately 0.100 mm on each side of the edge strips 12, 14, and the thickness of the hot-melt adhesive coating 20 on the cords 18 is approximately 0.050 mm. It should be appreciated that the relative thicknesses of the hot melt adhesives 16, 20 may vary depending on a thickness of the diffusion medium layers 4, 6 between which the edge strips 12, 14 and the cords 18 are disposed.

The hot-melt adhesives 16, 20 on each of the edge strip 12, 14 and the elongate cords 18 may be the same or different, as desired. Materials for hot-melt adhesives 16, 20 having sufficient resistance to the operating environment of the water vapor transfer device 2 may be used. As nonlimiting examples, the hot-melt adhesive 16, 20 may include an ethyl-vinyl acetate (EVA) polymer, an ethyl acrylate polymer, or a polyethylene polymer. In a particular embodiment, the hot melt adhesive 16, 20 is a DuPont™ Bynel® coextrudable adhesive resin commercially available from the E. I. du Pont de Nemours and Company. Other suitable materials for the hot-melt adhesive 16, 20 may be employed, as desired.

The present disclosure includes a method for assembly of the water vapor transfer device 2. The method may first include the steps of providing the pair of diffusion medium layers 4, 6, the pair of edge strips 12, 14 having the hot-melt adhesive coating 16, and the array of elongate cords 18 having a hot-melt adhesive coating 20. The edge strips 12, 14 and the elongate cords 18 are disposed between the diffusion medium layers 4, 6 to form the separator assembly 24. One of the edge strips 12, 14 is disposed adjacent the first edge 8 of each of the diffusion medium layers 4, 6. The other of the edge strips 12, 14 is disposed adjacent the second edge 10 of each of the diffusion medium layers 4, 6. The cords 18 are arranged between the diffusion medium layers 4, 6 and intermediate the edge strips 12, 14. The cords 18 may be arranged substantially parallel with the first and second edges 8, 10.

Although the separator assembly 24 may be assembled as described hereinabove, one of ordinary skill in the art should understand that the separator assembly 24 may be provided pre-assembled for subsequent assembly with the polymer membranes 26, 28 to form the water vapor transfer device 2.

The separator assembly 24 may be provided as discrete pre-assembled plates, or in the form of a continuous roll, as desired.

Figure 2:
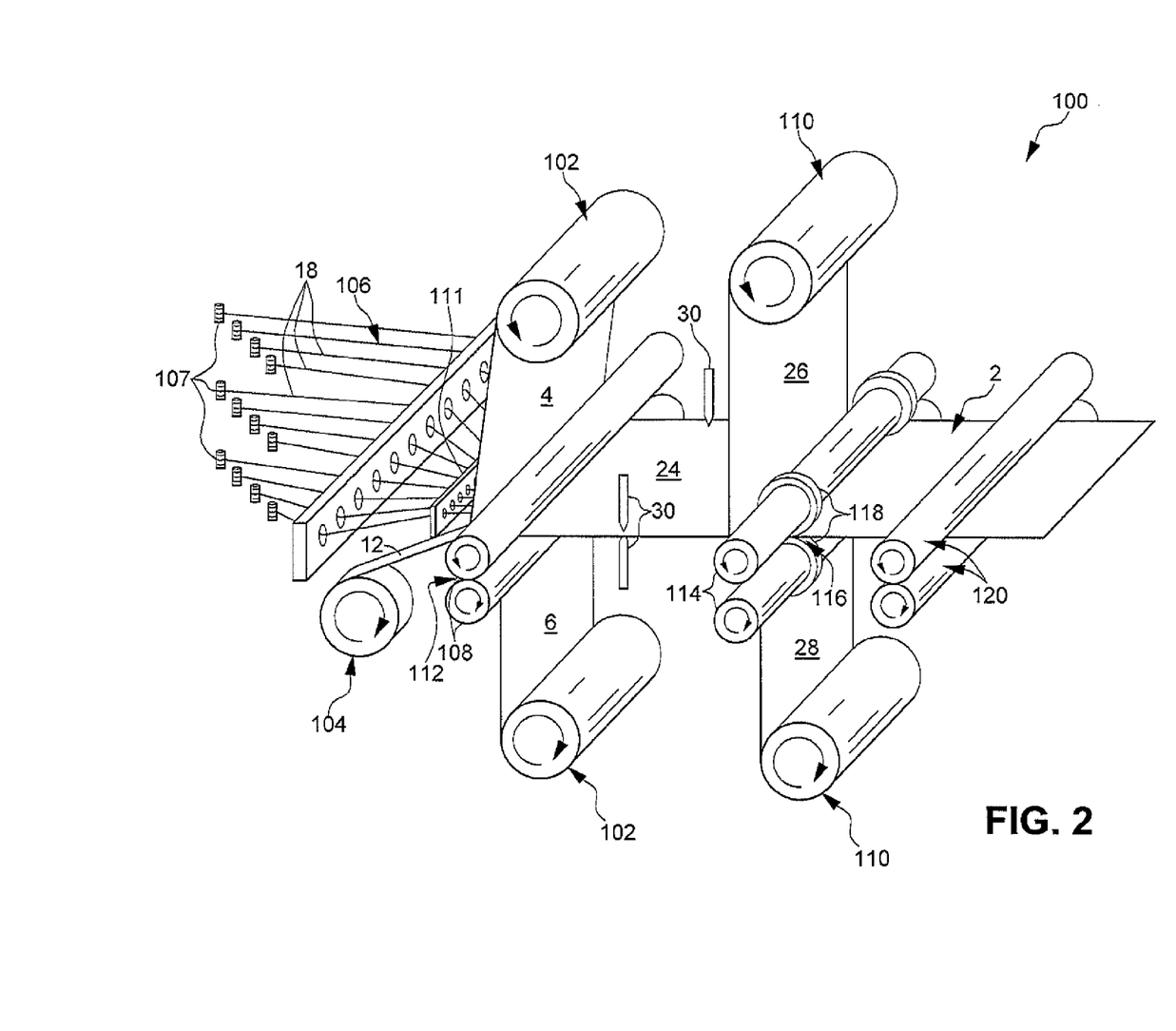
FIG. 2 illustrates a continuous system for assembly of a water vapor transfer device according to one embodiment of the disclosure.
Figure 3:
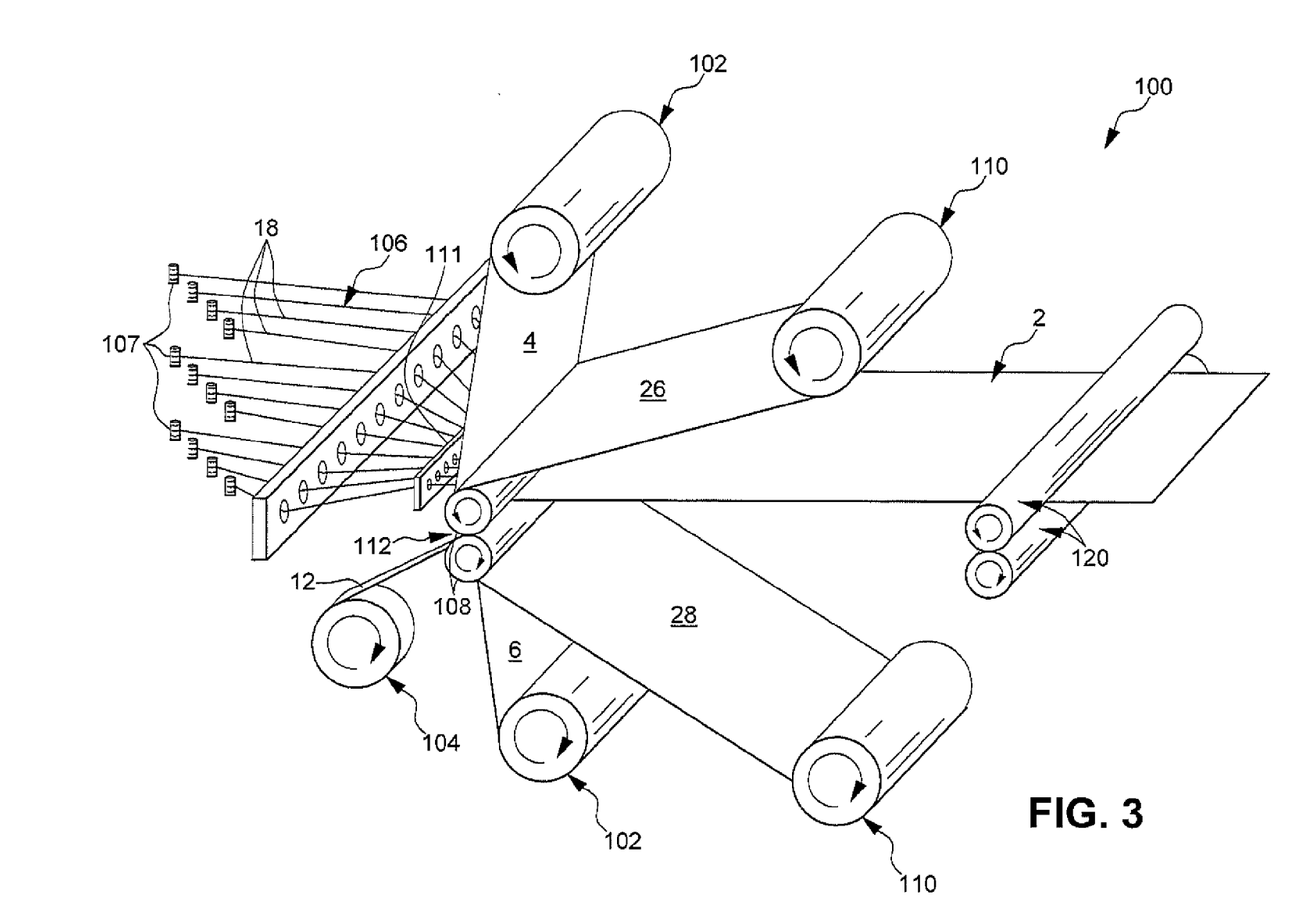
FIG. 3 illustrates a continuous system for assembly of a water vapor transfer device according to another embodiment of the disclosure.

One of the polymer membranes 26, 28 is then disposed on each of the diffusion medium layers 4, 6 of the separator assembly 24. The polymer membranes 26, 28 may be disposed on the diffusion medium layers 4, 6 after the formation of the separator assembly 24, for example, as shown in FIG. 2, or simultaneous with the formation of the separator assembly 24, for example, as shown in FIG. 3.

A combination of heat and pressure is applied to the separator assembly 24 to cause the hot-melt adhesive coating 16 of the edge strips 12, 14 to melt and permeate through the diffusion medium layers 4, 6. Once the heat and pressure are removed, the hot-melt adhesive 16 cools and solidifies throughout the diffusion medium layers 4, 6, thereby causing the edge strips 12, 14 to be bonded with the diffusion medium layers 4, 6. The hot-melt adhesive coating 16 on the edge strips 12, 14 may also contact the polymer membranes 26, 28. Where there is an insufficient amount of original hot-melt adhesive on the edge strips 12, 14 to contact the polymer membranes 26, 28, an additional adhesive 30 (shown in FIG. 2) may be applied. The adhesive coating 20 of the cords 18 is also caused to melt. The adhesive coating 20 of the cords permeates only into the diffusion medium layers 4, 6. The adhesive coating 20 of the cords 18 does not contact the polymer membranes 26, 28.

The separator assembly 24 is then cooled to cause the hot-melt adhesive coatings 16, 20 on the edge strips 12, 14 and the cords 18 to solidify. The hot-melt adhesive coating 16 bonds the edge strips 12, 14 to both the diffusion medium layers 4, 6 and the polymer membranes 26, 28. The hot-melt adhesive coating 20 of the cords 18 bonds the cords 18 to only the diffusion medium layers 4, 6. The water vapor transfer device 2 of the present disclosure is thereby formed.

It should be understood that the heat and pressure is selected based on the type of hot-melt adhesive coating 16, 20 employed. The heat and pressure is also selected to militate against a de-bonding of the hot-melt adhesive coating 16, 20 under typical operating conditions for the water vapor transfer device 2. In a nonlimiting example, the hot-melt adhesive coating 16, 20 is heated to a temperature of approximately 300° F. at a pressure of approximately 0.1 tons. The heat and pressure may be applied to the hot-melt adhesive coating 16, 20 for up to approximately 30 seconds, as a nonlimiting example. Other temperatures, pressures, and times may be selected, as desired.

It should also be appreciated that the step of applying heat and pressure may be performed prior to disposing the polymer membranes 26, 28 on the diffusion medium layers 4, 6, or after the polymer membranes 26, 28 are disposed on the diffusion medium layers 4, 6. Where the heat and pressure is applied prior to disposing the polymer membranes 26, 28 on the diffusion medium layers 4, 6, the hot-melt adhesive coatings 16, 20 of the edge strips 12, 14 and the cords 18 are caused to melt and permeate into the diffusion medium layers 4, 6. Where the heat and pressure are also applied after the polymer membranes 26, 28 are disposed on the diffusion medium layers 4, 6, the hot-melt adhesive coating 16 of the edge strips 12, 14 is caused to melt and also contact the polymer membranes 26, 28. In a particular embodiment shown in FIG. 2, the step of applying heat and pressure after disposing the polymer membranes 26, 28 on the diffusion medium layers 4, 6 of the separator assembly 24 is only performed at the first and second edges 8, 10 where the edge strips 12, 14 are disposed.

The method of the present disclosure may further include a step of applying the additional adhesive 30 adjacent the first edge 8 and the second edge 10 of each of the diffusion medium layers 4, 6 of the separator assembly 24. The additional adhesive 30 may be another hot-melt adhesive. In the particular embodiment shown in FIG. 2, the additional adhesive 30 is applied prior to disposing the polymer membranes 26, 28 on the diffusion medium layers 4, 6 of the separator assembly 24.

As illustrated in FIGS. 2 and 3, the present disclosure further includes a continuous system 100 for assembly of the water vapor transfer device 2. The system 100 includes a pair of diffusion medium layer rolls 102, a pair of edge strip rolls 104, a cord distribution subsystem 106, a pair of first heated rollers 108, and a pair of membrane rolls 110.

The diffusion medium layer rolls 102 continuously provide the diffusion medium layers 4, 6 for the water vapor transfer device 2. The pair of edge strip rolls 104 continuously provides the edge strips 12, 14 having the hot-melt adhesive coating 16. The cord distribution subsystem 106 continuously provides the array of cords 18 having the hot-melt adhesive coating 20. The cord distribution subsystem 106 may include a string alignment tooling 111 receiving the cords 18 from a plurality of cord spools 107 and arranging the cords 18 into the desired array. In certain embodiments, the edge strip rolls 104 and the cord distribution subsystem 106 may provide uncoated edge strips 12, 14 and cords 18 to an adhesive applicator subsystem (not shown) where the hot-melt adhesive coatings 16, 20 are applied to the edge strips 12, 14 and cords 18 prior to being assembled in the separator assembly 24.

The pair of first heated rollers 108 have a nip 112 that receives the diffusion medium layers 4, 6, the edge strips 12, 14, and the cords 18. The first heated rollers 108 laminate the edge strips 12, 14 and the array of cords 18 between the diffusion medium layers 4, 6 to form the separator assembly 24. The pair of membrane rolls 110 places the polymer membranes 26, 28 on the diffusion medium layers 4, 6 of the separator assembly 24 to form the water vapor transfer device 2.

With reference to FIG. 3, the membranes rolls 110 provide the polymer membranes 26, 28 to the nip 112 of the first heated rollers 108. The first heated rollers 108 may thereby sandwich the diffusion medium layers 4, 6, the edge strips 12, 14, the cords 18, and the polymer membranes 26, 28 therebetween. The first heated rollers provide a sufficient heat and pressure to cause the hot-melt adhesive 16 on the edge strips 12, 14 to melt and bond to both the diffusion medium layers 12, 14 and the polymer membranes 26, 28. The first heated rollers also provide a sufficient heat to cause the hot-melt adhesive 20 on the cords 18 to melt and bond to only the diffusion medium layers 12, 14. One of ordinary skill in the art should understand that the amount of the hot melt adhesive 20 on the cords 18 may be limited in order to militate against the bonding of the cords 18 with the polymer membranes 26, 28. In other embodiments, a melting temperature for the hot-melt adhesive 20 on the cords 18 may be greater than a melting temperature of the hot-melt adhesive 16 on the edge strips 12, 14 in order to control an amount of melting and permeation of the hot melt adhesive 20 on the cords 18 into the diffusion medium layers 4, 6. The bonding of the hot melt adhesive 20 on the cords 18 with the polymer membranes 26, 28 may thereby be militated against.

With renewed reference to FIG. 2, the system 100 of the present disclosure may further include a pair of second heated rollers 114 having a nip 116 for receiving the separator assembly 24 and the polymer membranes 26, 28. The second heated rollers 114 may each have raised portions 118. The raised portions 118 are configured to contact the polymer membranes 26, 28 and apply heat and pressure to the polymer membranes 26, 28 and the separator assembly 24. In particular, the raised portions 118 of the second heated rollers 114 are heated discs. The raised portions 118 have the nip 116 for pressing the polymer membranes 26, 28 against only the portions of the separator assembly 24 where the edge strips 12, 14 are present.

In an illustrative embodiment, the raised portions 118 only apply heat and pressure to the polymer membranes 26, 28 and the separator assembly 24 adjacent the first and second edges 8, 10 of the diffusion medium layers 4, 6. Likewise, a remainder of the second heated rollers 114 between the raised portions 118 does not contact the polymer membranes 26, 28. It should be appreciated that the raised portions 118 only apply heat and pressure to re-melt the hot-melt adhesive 16 on the edge strips 12, 14 in order to cause the hot-melt adhesive 16 to bond with the polymer membranes 26, 28. The raised portions 118 also militate against a re-melting of the hot-melt adhesive 20 on the cords 18 and a subsequent undesirable bonding of the cords 18 with the polymer membranes 26, 28.

The continuous system 100 of the present disclosure may further include a pair of cut rollers 120. The cut rollers 120 may have blades for cutting the water vapor transfer device 2 after the polymer membranes 26, 28 have been disposed on the diffusion medium layers 4, 6 of the separator assembly 24.

Figure 4A:
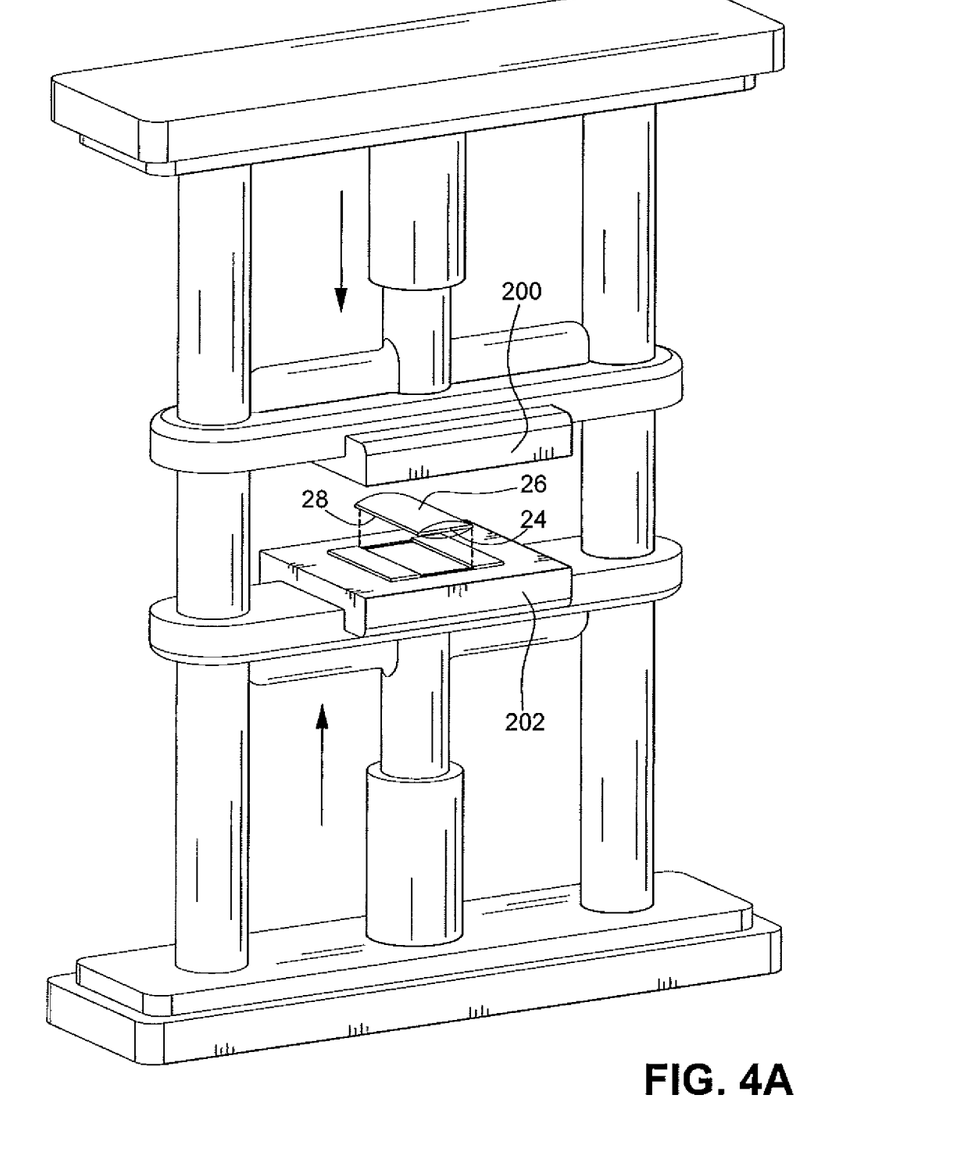
FIGS. 4A-4B illustrate batch systems for assembly of a water vapor transfer device according to a further embodiment of the disclosure.
Figure 4B:
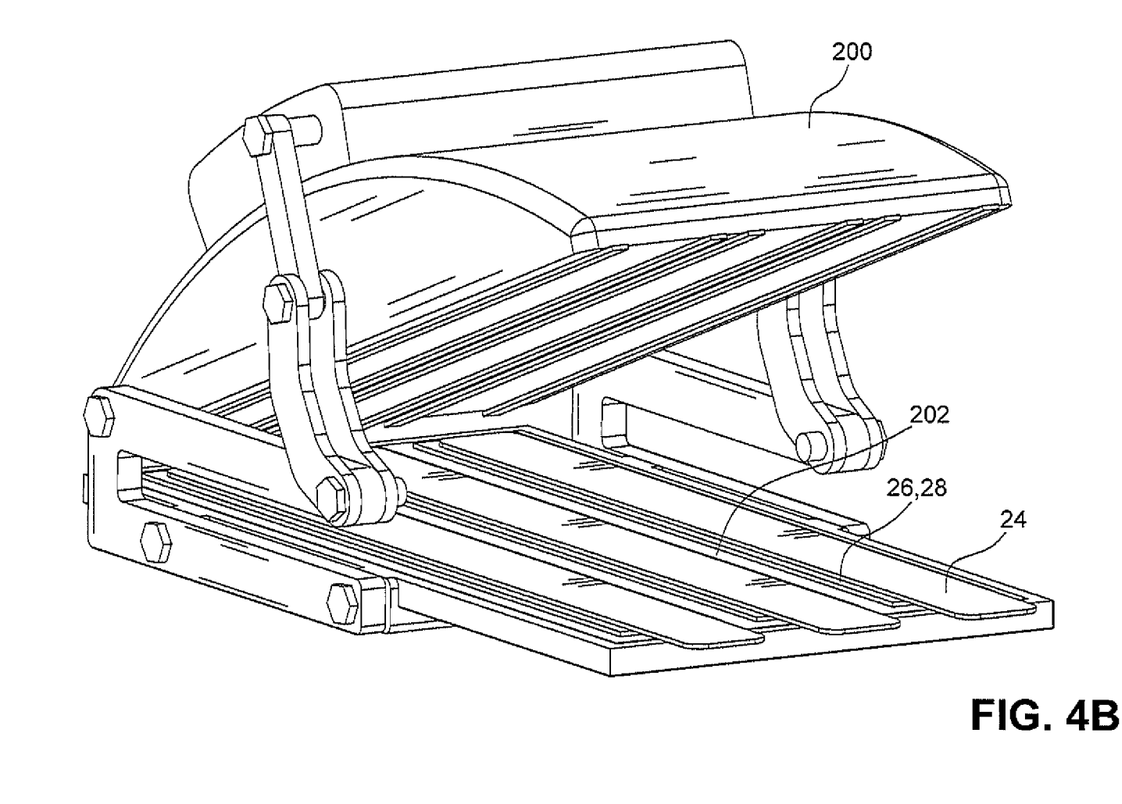

Although the system 100 described hereinabove is continuous, one of ordinary skill in the art should understand that the method of the present disclosure may also be practiced as a batch process, for example, as shown in FIGS. 4A and 4B. In a particular embodiment, a batch tooling to laminate the polymer membranes 26, 28 to the separator assembly 24 may include a pair of platens 200, 202. One or more of the platens 200, 202 is heated, as desired. In certain embodiments, as shown in FIG. 4A, the platens 200, 202 may open and close by a vertical movement of an entirety of one of the platens 200, 202 by one of electrical, hydraulic, and pneumatic actuation. In other embodiments, as shown in FIG. 4B, the platens 200, 202 may be hinged or clam-shelled. The hinged or clam-shelled platens 200, 202 may be manually actuated to open and close.

Where only one of the platens 200, 202 is heated, one of the polymer membranes 26, 28 may first be inserted between the separator assembly 24 and the heated one of the platens 200, 202. The platens 200, 202 are then closed for a sufficient amount of time, and at a sufficient temperature and pressure, to melt the hot-melt adhesive 16 on one side of the separator assembly 24. The combined separator assembly 24 and one of the polymer membranes 26, 28 is flipped over. The other one of the membranes 26, 28 is then inserted between the heated one of the platens 200, 202 and the separator assembly 24. The platens 200, 202 are again closed to melt the hot-melt adhesives 16 on the other side of the separator assembly 24. The water vapor transfer device 2 as described hereinabove may thereby be fabricated in a batch process. Wherein a plurality of the water vapor transfer devices 2 are formed together as one batch, as shown in FIG. 4B, for example, they may be subsequently separated in a cutting operation, as desired.

The employment of hot-melt adhesives 16, 20 as disclosed hereinabove provides a number of advantages in comparison to use of state-of-the-art pressure sensitive adhesive (PSA). If a sufficient amount of the hot-melt adhesive 16 is present on the edge strips 12, 14, another adhesive does not need to be added to the assembly. The hot-melt adhesive 16 already existing in the edge strips 12, 14 and the adjacent diffusion medium layers 4, 6 only needs to be re-melted to bond with the polymer membranes 26, 28. Re-melting the hot-melt adhesive 16 on the edge strips 12, 14 lends itself to a high volume roll type manufacturing process where the assembly of the separator assembly 24 and the attachment of the polymer membranes 26, 28 are all performed by the same system 100. The method and system 100 also reduces an overall height of the water vapor transfer device 2 because the same hot-melt adhesive 16 is used for bonding the edge strips 12, 14 to both the diffusion medium layers 4, 6 and the polymer membranes 26, 28. There is no additional layer of adhesive required for sandwiching between the polymer membrane 26, 28 and the separator assembly 24.

While certain representative embodiments and details have been shown for purposes of illustrating the invention, it will be apparent to those skilled in the art that various changes may be made without departing from the scope of the disclosure, which is further described in the following appended claims.

What is claimed is:

1. A water vapor transfer device for a fuel cell comprising:
a pair of diffusion medium layers, each of the diffusion medium layers having a first edge and a second edge;
a pair of edge strips disposed between the diffusion medium layers, one of the edge strips disposed adjacent the first edge of each of the diffusion medium layers, and an other of the edge strips disposed adjacent the second edge of each of the diffusion medium layers, each of the edge strips having a first major surface and a second major surface, the first major surface spaced apart from the second major surface, an entirety of the first major surface and an entirety of the second major surface of one of the edge strips bonded to each of the diffusion medium layers with a hot-melt adhesive;
an array of elongate cords disposed between the diffusion medium layers and arranged substantially parallel with the first edge and the second edge intermediate the edge strips, the elongate cords bonded to each of the diffusion medium layers with a hot-melt adhesive and defining a plurality of flow channels between the diffusion medium layers;
a pair of polymer membranes between which the diffusion medium layers, the edges strips, and the elongate cords are disposed, the polymer membranes bonded to the diffusion medium layers adjacent the edge strips with the hot-melt adhesive from the edge strips, the hot melt adhesive contiguous through the diffusion medium layers from the adjacent edge strips to the adjacent polymer membranes, the polymer membranes not bonded to the diffusion medium layers intermediate the edge strips.

2. The water vapor transfer device of claim 1, wherein the edge strips and the elongate cords are coated with the hot-melt adhesive.

3. The water vapor transfer device of claim 2, wherein the hot-melt adhesive coating on the edge strips has a thickness that is greater than a thickness of the hot-melt adhesive coating on the cords.

4. The water vapor transfer device of claim 3, wherein the thickness of the hot-melt adhesive coating on the edge strips is sufficient to permeate through the diffusion medium layers and bond the polymer membrane.

5. The water vapor transfer device of claim 4, wherein the thickness of the adhesive coating on the cords is insufficient to permeate through the diffusion medium layers and bond the polymer membrane.

6. The water vapor transfer device of claim 1, wherein the diffusion medium layers are formed from one of a glass fiber, a glass-based paper, a carbon fiber, and a carbon-based paper.

7. The water vapor transfer device of claim 1, wherein the edge strips and the cords are formed from one of polypropylene and glass.

8. A method for assembly of a water vapor transfer device, the method comprising the steps of:
providing a separator assembly including a pair of edge strips and an array of elongate cords disposed between a pair of diffusion medium layers, one of the edge strips disposed adjacent a first edge of each of the diffusion medium layers, and an other of the edge strips disposed adjacent a second edge of each of the diffusion medium layers, each of the edge strips having a first major surface and a second major surface, the first major surface spaced apart from the second major surface, an entirety of the first major surface and an entirety of the second major surface of one of the edge strips bonded to each of the diffusion medium layers with a hot-melt adhesive, and the array of elongate cords arranged substantially parallel with the first edge and the second edge intermediate the edge strips, the elongate cords bonded to each of the diffusion medium layers with a hot-melt adhesive and defining a plurality of flow channels between the diffusion medium layers;
disposing a polymer membrane on each of the diffusion medium layers of the separator assembly;
applying heat and pressure to the separator assembly to cause the adhesive coating of the edge strips to melt and permeate through the diffusion medium layers and contact the polymer membranes, and the adhesive coating of the cords to melt and permeate only into the diffusion medium layers and not contact the polymer membranes;
cooling the separator assembly to cause the hot-melt adhesive coatings on the edge strips and the cords to solidify and bond the edge strips to both the diffusion medium layers and the polymer membranes, the hot melt adhesive contiguous through the diffusion medium layers from the adjacent edge strips to the adjacent polymer membranes, and bond the cords to only to the diffusion medium layers, thereby forming the water vapor transfer device.

9. The method of claim 8, wherein the step of applying heat and pressure is conducted prior to disposing the polymer membranes on the diffusion medium layers to cause the hot-melt adhesive coatings of the edge strips and the cords to melt and permeate into the diffusion medium layers.

10. The method of claim 9, wherein the step of applying heat and pressure is also conducted after disposing the polymer membrane on each of the diffusion medium layers of the separator assembly to cause the hot-melt adhesive coatings of the edge strips to melt and contact the polymer membranes.

11. The method of claim 10, wherein the step of applying heat and pressure after disposing the polymer membrane on each of the diffusion medium layers of the separator assembly is only conducted at a first edge and a second edge of the separator assembly beneath which the edge strips are disposed.

12. The method of claim 10, wherein the step of providing the separator assembly includes the steps of:
providing a pair of diffusion medium layers, each of the diffusion medium layers having a first edge and a second edge, a pair of edge strips having a hot-melt adhesive coating, and an array of elongate cords having a hot-melt adhesive coating; and
disposing the edge strips and the elongate cords between the diffusion medium layers to form a separator assembly, one of the edge strips disposed adjacent the first edge of each of the diffusion medium layers, and an other of the edge strips disposed adjacent the second edge of each of the diffusion medium layers, the cords disposed between the diffusion medium layers and arranged substantially parallel with the first edge and the second edge intermediate the edge strips.

* * * * *